March 15, 1955  W. L. HENDERSON ET AL  2,704,181
ENCLOSING CASE
Filed Feb. 16, 1953

Inventors:
Wayne L. Henderson,
Jack E. Haymaker,
by
Their Attorney.

United States Patent Office 2,704,181
Patented Mar. 15, 1955

2,704,181

ENCLOSING CASE

Wayne L. Henderson and Jack E. Haymaker, Fort Wayne, Ind., assignors to General Electric Company, a corporation of New York Application February 16, 1953, Serial No. 336,996

3 Claims. (Cl. 229—37)

This invention relates to enclosing cases and more particularly to a capacitor enclosing case formed of a single sheet of relatively thin insulating material.

Capacitors are frequently associated with ballast transformers and other inductive devices used in arc discharge lighting installations, and the capacitor and inductive device are frequently enclosed in the same case. In the past, capacitors constructed in rectangular cases have been used for convenience in mounting within the overall enclosing case. These capacitors have been expensive and difficult to make, and it is, therefore, desirable to provide an arrangement which will permit the use of a more inexpensive capacitor of the oval type. It is further desirable that this arrangement be simple and readily assembled, that a firm mounting be provided for the capacitor, and that it establish a heat barrier between the coil of the inductive device and the capacitor.

It is, therefore, an object of this invention to provide an improved enclosing case member incorporating the desirable features set forth above.

Further objects and advantages of this invention will become apparent by reference to the following description and the accompanying drawing, and the features of novelty which characterize this invention will be pointed out with particularity in the claims annexed to and forming a part of this specification.

In accordance with this invention, an enclosing case member is provided formed from a single sheet of relatively thin material. This case has a rectangular body portion for enclosing the capacitor, the body portion being open at one end and having four side walls and a top wall in which an opening is formed for receiving the capacitor terminals. Two adjoining side walls extend substantially beyond the top wall and thus space the capacitor from the inductive device.

In the drawing, Fig. 1 is a view, in perspective partly in section, illustrating a ballast transformer having a capacitor incorporating the improved case of this invention associated therewith;

Figure 1:
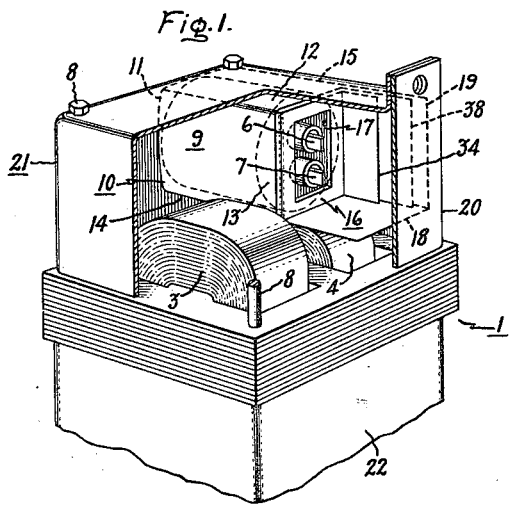

Referring now to Fig. 1, there is shown an inductive device 1, such as a ballast transformer having a core 2, formed of a plurality of relatively thin laminations of magnetic material, on which a primary and extension winding coils 3 and 4 are positioned. A capacitor 5 is associated with the device 1, being connected thereto by suitable leads (not shown).

Figure 2:
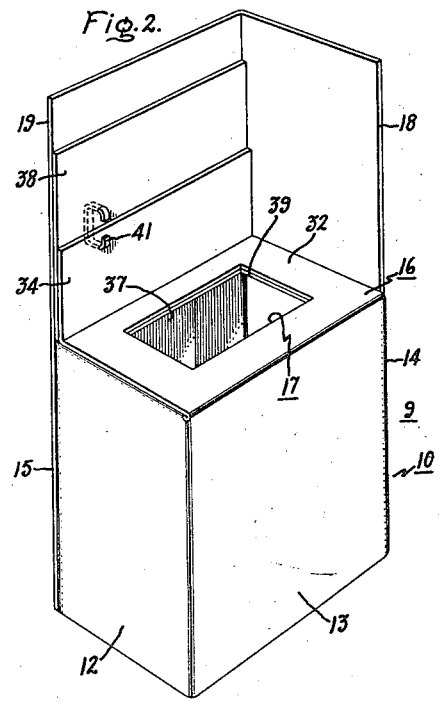
Fig. 2 is a view in perspective illustrating the assembled capacitor enclosing case of this invention.

Capacitor 5 is enclosed in an enclosing case, generally identified as 9, formed from a single sheet of relatively thin insulating material. Case 9 has a body portion 10 in which capacitor 5 is arranged. Body portion 10 is open at its bottom 11 to permit positioning capacitor 5 therein, and is provided with four side walls, 12, 13, 14 and 15 and a top wall 16. An opening 17, as shown in Fig. 2, is formed in top wall 16 through which the terminals 6 and 7 of capacitor 5 extend. Side walls 14 and 15 have extension portions 18 and 19 extending substantially beyond top wall 16. Capacitor case 9 is positioned on top of coil 4 with its side wall 15 and extension portion 19 abutting wall 20 of upper enclosing case 21 and with the exposed bottom of capacitor 5 abutting the back wall of case 21. It will thus be seen that capacitor 5 is completely enclosed and separated from coils 3 and 4. A lower enclosing case 22 is also provided and the assembly is held together by through-bolts 8.

Figure 3:
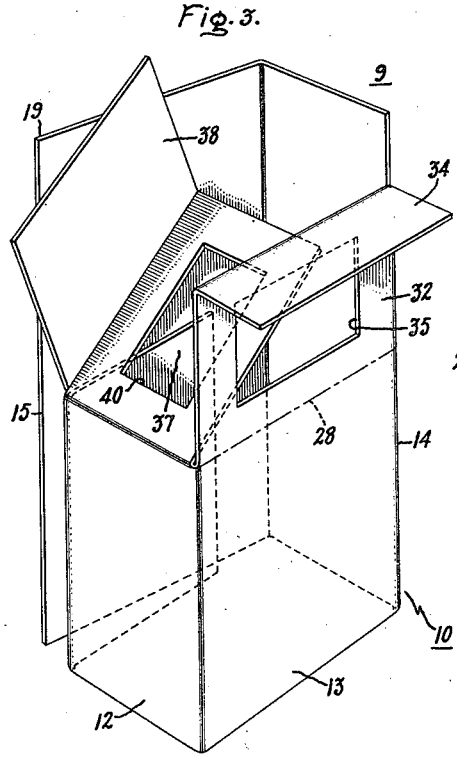
Fig. 3 is a view in perspective illustrating the assembly of the case of Fig. 2.
Figure 4:
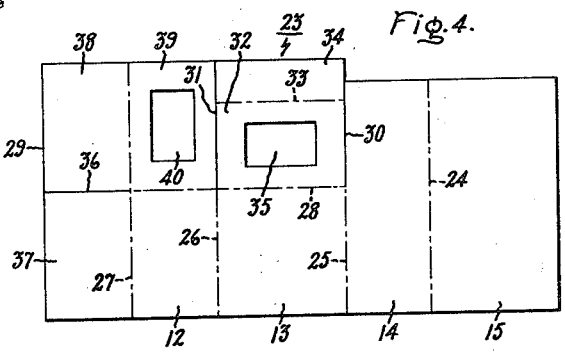
Fig. 4 illustrates a blank from which when folded produces the construction of Fig. 2.

Referring now to Figs. 2, 3 and 4, the capacitor enclosing case 9 is formed from a single substantially rectangular blank 23 of relatively thin insulating material. Blank 23 has a first preformed transverse crease 24 formed therein defining side wall 15 and a second transverse crease 25 spaced from crease 24 defining side wall 14. A third transverse crease 26 is formed spaced from crease 25 defining side wall 13 which is of the same width as side wall 15 and a fourth transverse crease 27, spaced from crease 26, defines side wall 12 which is of the same width as side wall 14. A horizontal crease 28 is formed in blank 23 extending inwardly from transverse edge 29 to transverse crease 25. Transverse slits 30 and 31 are formed in blank 23 along creases 25 and 26 respectively thus defining top layer 32 and a longitudinal crease 33 extends between slits 30 and 31 defining integral extension 34. A substantially rectangular opening 35 having its principal axis longitudinally disposed is formed in top layer 32. A longitudinal slit 36 is formed along longitudinal crease 28 from transverse edge 29 to transverse crease 27 thus defining side extension 37 and top layer extension 38. Creases 27 and 28 define side section 12 and top layer 39 in which a substantially rectangular opening 40, of the same size as opening 35, but with its principal dimension transversely arranged, is formed.

Referring now more particularly to Fig. 3, it is seen that the blank 23 is folded along creases 24, 25, 26 and 27 so that extension 37 abuts the inside of side wall 15 thereby causing side walls 12, 13, 14 and 15 to form rectangular body portion 10. Top layer 39 is then folded over a right angle to side portion 12 and extension 38 is in turn folded at a right angle to top layer 39 thus abutting extension 19 of side wall 15. Top layer 32 is then folded over at a right angle to side wall 13 so that it abuts the upper surface of top layer 39 to form top wall 16 and its extension 34 is folded at a right angle to abut the outer surface of extension 38 of top layer 39. Openings 35 in top layer 32 and 40 in top layer 39 are now in registry and form opening 17 through which terminals 5 and 8 project. The casing member is then held in assembled relation by a suitable staple 41 holding extension portion 19 of side wall 15 and extensions 34 and 38 of top layers 32 and 39 together.

It will now be seen that capacitor casing 9 has a body portion 10 formed of four side walls 12, 13, 14 and 15 and top wall 16. The body portion 10 is open at its bottom and an opening 17 is formed in the top wall 16 to accommodate the capacitor terminals. Adjoining side walls 14 and 15 have extension portions 18 and 19 extending substantially beyond top wall 16. Top wall 16 is formed of two layers 32 and 39, layer 39 being integral with side wall 12 and having an extension 38 abutting side wall extension 19. Top layer 32 is integral with side wall 13 and has an integral extension 34 abutting extension 38 of top layer 39.

It will now be seen that the improved case of this invention can be readily formed from a single sheet of relatively thin insulating material, such as cardboard, and that it insures firm mounting of the capacitor. Furthermore the novel construction of the case facilitates easy and rapid assembly.

While we have shown and described a particular embodiment of this invention, further modifications and improvements will occur to those skilled in the art. We desire that it be understood therefore that this invention is not limited to the form shown and we intend in the appended claims to cover all modifications which do not depart from the spirit and scope of this invention.

What we claim as new and desire to secure by Letters Patent of the United States is:

1. An enclosing case member formed from a single sheet of relatively thin material having a rectangular body portion open at the bottom with four side walls and a top wall, two adjoining side walls having portions extending substantially beyond said top wall, said top wall having two layers, one of said layers being integral with one of the remaining two of said side walls and having an integral extension abutting one of said side wall extension portions, the other of said layers being integral with the other of said remaining two side walls and having an integral extension abutting said first layer integral extension.

2. A capacitor enclosing case member formed from a single sheet of relatively thin insulating material having a rectangular body portion adapted to receive said capacitor, said body portion having four integrally connected side walls and a top wall, two adjoining side walls having portions extending substantially beyond said top wall, a third of said side walls having an integral extension abutting the inner side of the one of said adjoining side walls adjacent thereto, said top wall having an opening formed therein for the terminals of said capacitor and being formed of two layers, the bottom one of said layers being integral with said third side wall and having an integral extension abutting the side wall extension adjacent said third side wall, the top one of said layers being integral with the fourth of said side walls and having an integral extension abutting said first layer integral extension.

3. A substantially rectangular blank of relatively thin insulating material for forming a casing member, said blank having a first section defined by a first transverse crease spaced from one end thereof and a second section defined by a second transverse crease spaced from said first crease, said blank having a third section of the same width as said first section defined by a third transverse crease spaced from said second crease, said blank having a longitudinal crease extending between said second and third creases thereby dividing said third section into inner and outer portions, said blank having slits formed along said second and third transverse creases from a longitudinal edge to said longitudinal crease, said outer portion of said third section having a longitudinal crease dividing the same into inner and outer parts, said inner part having a substantially rectangular opening formed therein, said blank having a fourth transverse crease spaced from said third transverse crease thereby defining fourth and fifth sections thereof, said fourth section being the same width as said second section, said fourth and fifth sections having a longitudinal crease formed therein in alignment with said third section longitudinal crease thereby respectively dividing said fourth and fifth sections into inner and outer portions, the outer portion of said fourth section adjacent said outer portion of said third section having a substantial rectangular opening formed therein with its primary axis disposed at right angles to the primary axis of said first named opening, said blank having another slit formed along said last named longitudinal crease from the other end thereof to said fourth transverse crease.

References Cited in the file of this patent

UNITED STATES PATENTS

| | | |
|---|---|---|
| 2,066,963 | Curtis | Jan. 5, 1937 |
| 2,100,979 | Rowe | Nov. 30, 1937 |
| 2,105,025 | Curtis | Jan. 11, 1938 |
| 2,615,067 | Bridges | Oct. 21, 1953 |